(12) United States Patent
Stuck

(10) Patent No.: US 6,495,182 B1
(45) Date of Patent: Dec. 17, 2002

(54) LOADER FOR CONVEYORIZED COOKING APPARATUS

(76) Inventor: Robert M. Stuck, 17 Old Stage Trail, Clover, SC (US) 29710

( * ) Notice: Subject to any disclaimer, the term of this patent is extended or adjusted under 35 U.S.C. 154(b) by 0 days.

(21) Appl. No.: 09/615,424

(22) Filed: Jul. 13, 2000

Related U.S. Application Data

(60) Provisional application No. 60/144,144, filed on Jul. 16, 1999.

(51) Int. Cl.⁷ .................................................. A23B 4/03
(52) U.S. Cl. ......................... 426/466; 426/523; 99/352; 99/387; 99/443 C; 221/1; 221/150 A; 221/251
(58) Field of Search ........................... 99/334, 386–387, 99/443 R, 443 C, 352; 426/523; 221/105 A, 1, 175–176, 251

(56) References Cited

U.S. PATENT DOCUMENTS

| | | | |
|---|---|---|---|
| 1,530,387 A | * | 3/1925 | Marra |
| 2,151,401 A | * | 3/1939 | Belcher .......................... 219/19 |
| 3,788,799 A | * | 1/1974 | Levi .............................. 432/143 |
| 4,151,930 A | | 5/1979 | Baker et al. ................... 221/129 |
| 4,182,231 A | | 1/1980 | Baker et al. ..................... 99/387 |
| 4,208,441 A | * | 6/1980 | Westover ...................... 426/293 |
| 4,226,176 A | * | 10/1980 | Macchi ........................... 99/335 |
| 4,254,697 A | | 3/1981 | Lang-Ree et al. ............... 99/387 |
| 4,444,094 A | | 4/1984 | Baker et al. ..................... 99/327 |
| 4,455,929 A | * | 6/1984 | Goudarzi et al. .............. 99/637 |
| 5,127,544 A | | 7/1992 | Robinson et al. .............. 221/93 |
| 5,588,354 A | | 12/1996 | Stuck et al. ..................... 99/386 |
| 5,755,551 A | | 5/1998 | Saeki et al. .............. 414/797.6 |

FOREIGN PATENT DOCUMENTS

| | | |
|---|---|---|
| GB | 2296914 | 7/1996 |
| WO | WO 93/12703 | 7/1993 |

* cited by examiner

*Primary Examiner*—Keith Hendricks
*Assistant Examiner*—Drew Becker
(74) *Attorney, Agent, or Firm*—Kennedy Covington Lobdell & Hickman, LLP

(57) ABSTRACT

A loader for a conveyorized cooking apparatus having a transverse partition spaced from an endless loading belt. The loader may include several longitudinal partitions defining a plurality of dispensing stations for loading hamburger patties and like food items. The transverse partition is spaced above the endless loading belt by a distance slightly greater than the typical thickness of a patty to be cooked. The endless loading belt has at least one transverse outwardly extending cleat. As the loading belt travels, the outwardly extending cleat comes into contact with the lowermost patty of each stack of patties on the loading belt and pushes the lowermost patty through the space between the transverse partition and the endless loading belt and into the cooking apparatus. A conveyorized cooking apparatus and a method of loading food patties into a conveyorized cooking apparatus are also disclosed.

20 Claims, 5 Drawing Sheets

LOADER FOR CONVEYORIZED COOKING APPARATUS

CROSS-REFERENCE TO RELATED APPLICATIONS

This application claims priority under 35 U.S.C. § 119 of U.S. Provisional Application No. 60/144,144 filed Jul. 16, 1999.

BACKGROUND OF THE INVENTION

1. Technical Field

The present invention relates generally to the field of conveyorized food cooking apparatus and more particularly to an apparatus for automatically loading food patties such as hamburgers, "veggie burgers," beef steaks, fish filets, and chicken filets into a conveyorized cooking apparatus.

2. Background Information

Commercial restaurants, particularly those restaurants commonly referred to as "fast food restaurants" that typically specialize in serving hamburgers and like sandwiches, are continually striving to reduce operating costs while at the same time increasing food cooking production and efficiency. Toward this end, many such restaurants have begun in recent years to utilize conveyorized cooking apparatus by which cooking times and temperatures can be better regulated than by more traditional cooking methods while at the same time eliminating or at least reducing the need for skilled labor.

A typical conveyorized cooking apparatus includes an endless cooking conveyor, which is often made from a metal mesh or metal rod "belt," having a horizontal run through a cooking chamber equipped with burners or heating elements on each side of the cooking conveyor. To use such an apparatus, workers manually separate the individual food patties, which are usually stored in a frozen patty stack, and then place several of the individual patties directly on the endless cooking conveyor. The patties then travel between burner elements where they are cooked and emerge from the cooking apparatus to be placed in a sandwich and sold.

While conveyorized cooking apparatus increase the food cooking production of fast food restaurants, manual loading of such apparatus creates many problems. Since individual food patties are placed directly on the actual cooking conveyor, there is a danger that employees may burn their hands by inadvertently touching the cooking conveyor while placing the patties. Since the cooking chamber is accessible, there is a danger that employees may push patties too far into the cooking apparatus when loading, which may result in undercooking the patties because they have not traveled completely through the cooking apparatus. Since there are no predetermined loading positions, manual loading may result in less than optimal cooking production if less patties are loaded on the cooking conveyor than the conveyor can accommodate or in incomplete cooking if too many patties are loaded on the conveyor and adjacent patties are overlapping. Finally, manual loading requires employees to make frequent trips to load the conveyorized cooking apparatus during peak demand times, rendering those employees unavailable for other tasks. If employees become preoccupied with other tasks and forget to make enough frequent trips to load the conveyorized cooking apparatus, then an insufficient supply of cooked food patties during large customer demand periods may result.

There have been several attempts to address the problems associated with manual loading of conveyorized cooking apparatus. U.S. Pat. No. 4,151,930 to Baker et al. discloses an automatic patty feeder using a solenoid and pusher mechanism to force the lowermost patty in a stack of patties onto a cooking chain. U.S. Pat. No. 4,182,231 to Baker et al. discloses a frozen patty feeder disposed partially over a cooking conveyor and having a transversely extending first wall and an inclined transversely extending second wall supported by a pair of side walls. A stack of staggered frozen patties are placed in the feeder and a combination of friction and interengagement urges the lowermost patty onto the cooking conveyor. U.S. Pat. No. 4,254,697 to Lang-Ree et al. discloses a broiler with a patty feed that also relies upon friction and partial interengagement to move the lowermost patty directly onto the cooking conveyor. U.S. Pat. No. 5,127,544 to Robinson et al. discloses an automatic sandwich preparation system in which a plurality of frozen hamburger stacks may be loaded into canisters. A reciprocating ejection slide is used to push the lowermost patty of a particular stack onto the cooking conveyor.

While these attempts to automate the loading process of a conveyorized cooking apparatus may have some advantages, they also have several significant disadvantages. Feeders having a plurality of moving cylinders or relying upon solenoid-activated mechanical linkages may severely disrupt food preparation capability should any of the associated loader parts fail. Moreover, use of such relatively complicated loader mechanisms conflicts with an overriding principle in the fast food industry that operating machinery must be kept as simple as possible, given the need for maximum food production, the heat and grease filled environment, and the relatively unsophisticated nature of the typical worker in the industry.

Feeder devices that rely on direct interengagement of the cooking conveyor with the lowermost patty can also be disadvantageous. If the lowermost patty is solidly frozen to the patty above, the cooking conveyor would continue to grind against the bottom of the lowermost patty. Moreover, such direct interengagement would be less successful for cooking thawed hamburger patties and patties such as fish filets that might tear more easily than frozen hamburger patties.

Feeder devices that do not adequately shield the feeder surfaces from the heat generated by the associated cooking apparatus increase the likelihood that the relatively cool patties will stick to the hot feeder surfaces. This is disadvantageous for two reasons. First, when patties stick to the feeder surfaces they will often fail to load properly into the cooking apparatus. Second, portions of the patties that stick to the hot feeder surfaces essentially bake onto those surfaces making clean up and sanitation of the feeder devices difficult.

Thus, it would be desirable to have in the art an automatic loader for a conveyorized cooking apparatus that is simple in construction and simple to operate. Ideally, such an improved loader would allow maximum utilization of the cooking chamber and ensure that all food items travel completely and consistently through the conveyorized cooking apparatus. Such an improved loader should sufficiently shield loader surfaces from heat generated by the associated cooking apparatus to minimize the possibility of patties sticking to hot loader surfaces and should be easy to adequately clean and sanitize. Finally, such an improved loader should be easily adaptable to existing conveyorized cooking apparatus and have a large food loading capability.

BRIEF SUMMARY OF THE INVENTION

The present invention overcomes the disadvantages and drawbacks associated with conventional patty feed apparatus by providing a loader for a conveyorized cooking apparatus having a transverse partition and an endless loading belt. The loader may include several longitudinal partitions to thereby define a plurality of dispensing stations for hamburger patties, veggie burger patties, chicken filets, fish filets, or the like (these and other generally flat and essentially stackable food items being referred to herein collectively as a "patty" or "patties"). The transverse partition is spaced above the endless loading belt by a distance slightly greater than the typical thickness of a patty to be cooked.

At least one outwardly extending cleat is provided to push the lowermost patty of a stack of patties between the loading belt and the transverse partition into the cooking apparatus. The endless loading belt can be driven, i.e., made to travel, by the same mechanism that powers the cooking conveyor. For example, a spur gear coupled on one roller supporting the endless loading belt may be coupled to a spur gear on one axle shaft supporting the cooking conveyor by use of an idler spur gear. In this way, the endless loading belt may travel at the same speed as the cooking conveyor when the cooking conveyor is driven. Alternatively, independent means such as a motor, chain, and sprocket wheel mechanism may be used to power the endless loading belt.

Stacks of patties such as frozen hamburgers, veggie burgers or other food products desired to be cooked are placed on the traveling endless loading belt, preferably immediately behind one of the outwardly extending cleats, and in positions corresponding to the dispensing station or stations defined by the dispensing partition unit. As the next outwardly extending cleat comes into contact with the lowermost patty of each stack of patties, the lowermost patties are pushed forward by the cleat through the space between the partition unit and the endless loading belt and onto the cooking conveyor. Other patties in the patty stacks, i.e., those patties that are not the lowermost patties, are prevented from going forward into the conveyorized cooking apparatus by the transverse partition. A sheet of TEFLON or other "non-stick" material may be positioned between the stacks of patties and the transverse partition of the dispensing partition unit to prevent the patties from sticking to the transverse partition.

In this manner, an employee in a fast food restaurant can quickly load a large amount of patties to be cooked into a conveyorized cooking apparatus by merely placing stacks of these patties on the endless loading belt at the dispensing station or stations. The employee is then free to perform other tasks and the present invention ensures that all such patties are automatically loaded sequentially and at spaced intervals into the conveyorized cooking apparatus. Advantageously, predefined dispensing stations may be used to ensure that each hamburger, filet piece or other patty is placed on the cooking conveyor at the same location and the plurality of equally spaced outwardly extending cleats on the endless loading belt creates a uniform space between successive patties as they travel through the cooking chamber. Thus, utilization of cooking chamber area is maximized and catching members may be correspondingly positioned at the discharge of the conveyorized cooking apparatus to collect the cooked pieces. Uniform cooking of the patties is achieved and the risk of undercooking patties is minimized because the loader ensures that each patty travels completely through the cooking apparatus. These and other advantages of the present invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below. In the drawings, which are not necessarily to scale.

DETAILED DESCRIPTION OF THE INVENTION

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that all alternatives, modifications and equivalents are intended to be included within the spirit and scope of the invention as defined by the appended claims.

Figure 1:
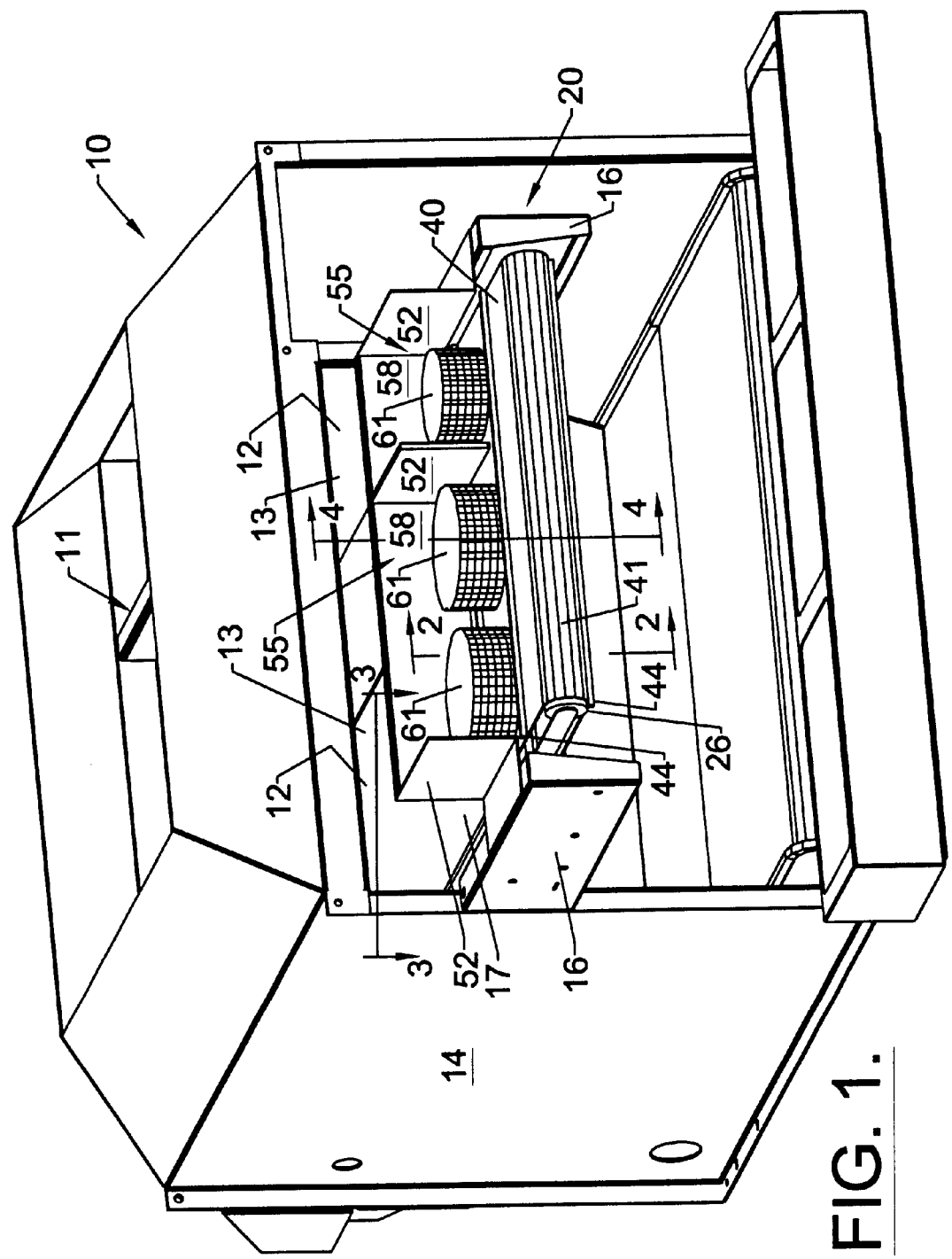
FIG. 1 is a perspective view of the automatic loader apparatus of the present invention as installed on a typical conveyorized cooking apparatus.

Turning to FIG. 1, there is shown a conveyorized cooking apparatus 10 equipped with the loader 20 in an embodiment particularly designed and suitable for use in a "fast food" style restaurant serving a variety of differing meat (and/or meat substitute) sandwiches, including for example, hamburgers (which may include different sizes of hamburger patties), veggie burgers, chicken filet sandwiches, fish filet sandwiches, steak sandwiches, and sandwiches made from other like stackable food patties. The conveyorized cooking apparatus 10 includes a housing 14 and may include one or more internal vertical walls 11 which divide the overall cooking chamber of the conveyorized cooking apparatus into one or more interior cooking chambers 12. While FIG. 1 illustrates a conveyorized cooking apparatus having a single interior vertical wall 11 and two interior cooking chambers 12, the loader of the present invention is readily used with conveyorized cooking apparatus having no internal vertical walls, i.e. those having only a single cooking chamber, or with conveyorized cooking apparatus having a plurality of interior vertical walls defining several interior cooking chambers. Each interior cooking chamber 12 of the conveyorized cooking apparatus 10 has an associated entry opening 13 through which individual patties to be cooked enter the cooking apparatus 10. The cooking apparatus also includes at least one endless cooking conveyor 17 to transport the food patties to be cooked between a plurality of cooking elements or burners located inside the cooking apparatus 10.

The loader 20 of the present invention is supported between a pair of forwardly extending housing arms 16. As used herein, the word "forward" refers to that side of the conveyorized cooking apparatus 10 into which patties 61 to be cooked are loaded into the apparatus. The loader 20 also includes an endless loading belt 40 having an outwardly facing side 41, an inwardly facing side 43 (FIG. 4), and one or more outwardly extending cleats 44 extending transversely across the endless loading belt 40 and projecting outwardly from the outward side 41 of the endless loading belt 40. As used herein, the term "transverse" refers to a direction generally across the endless loading belt and the term "longitudinal" refers to a direction in the general direction of loading belt travel.

Figure 2:
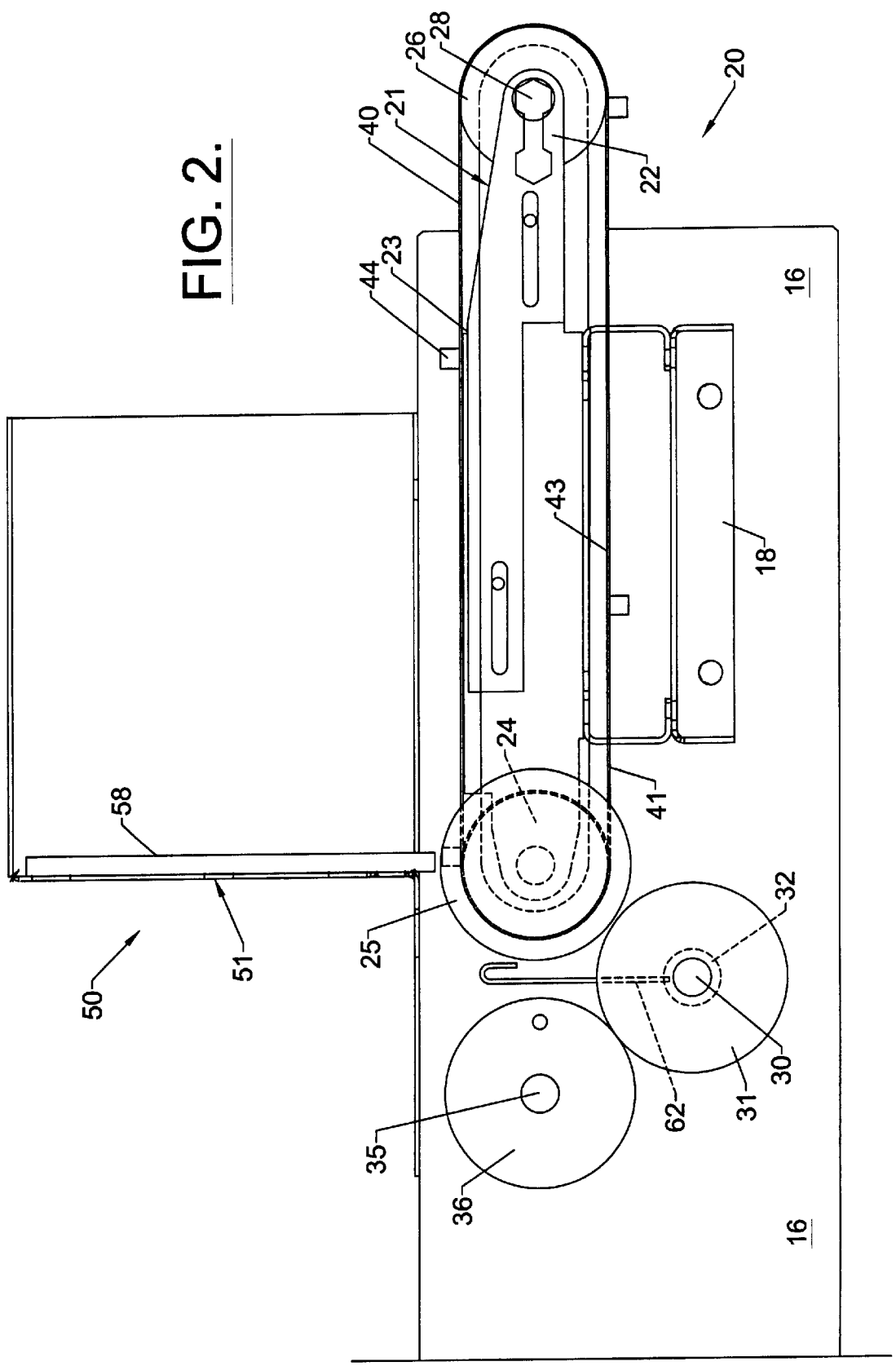
FIG. 2 is a partial vertical sectional view of the loader taken along line 2—2 of FIG. 1.

FIG. 2 illustrates one suitable mechanism by which the endless loading belt 40 is driven as well as the arrangement of loader components relative to the forwardly extending housing arms 16. A loader frame 21, which supports a first roller 24 and a second roller 26 journaled between a pair of loader frame arms 22, is a removable component that is supported on a support cross member 18 extending between the pair of forwardly extending housing arms 16 when the frame 21 is in use. The endless loading belt 40 is positioned around both the first roller 24 and the second roller 26 when the belt is in use. Because of the frictional relationship between the first and second rollers 24, 26 and the endless loading belt 40, imparting rotational movement to either roller causes the endless loading belt to move. As shown in FIG. 2, the loader frame 21 is supported on the cross member 18 in such a way as to provide sufficient clearance between the loader frame and the cross member to allow travel of the loading belt 40.

Figure 3:
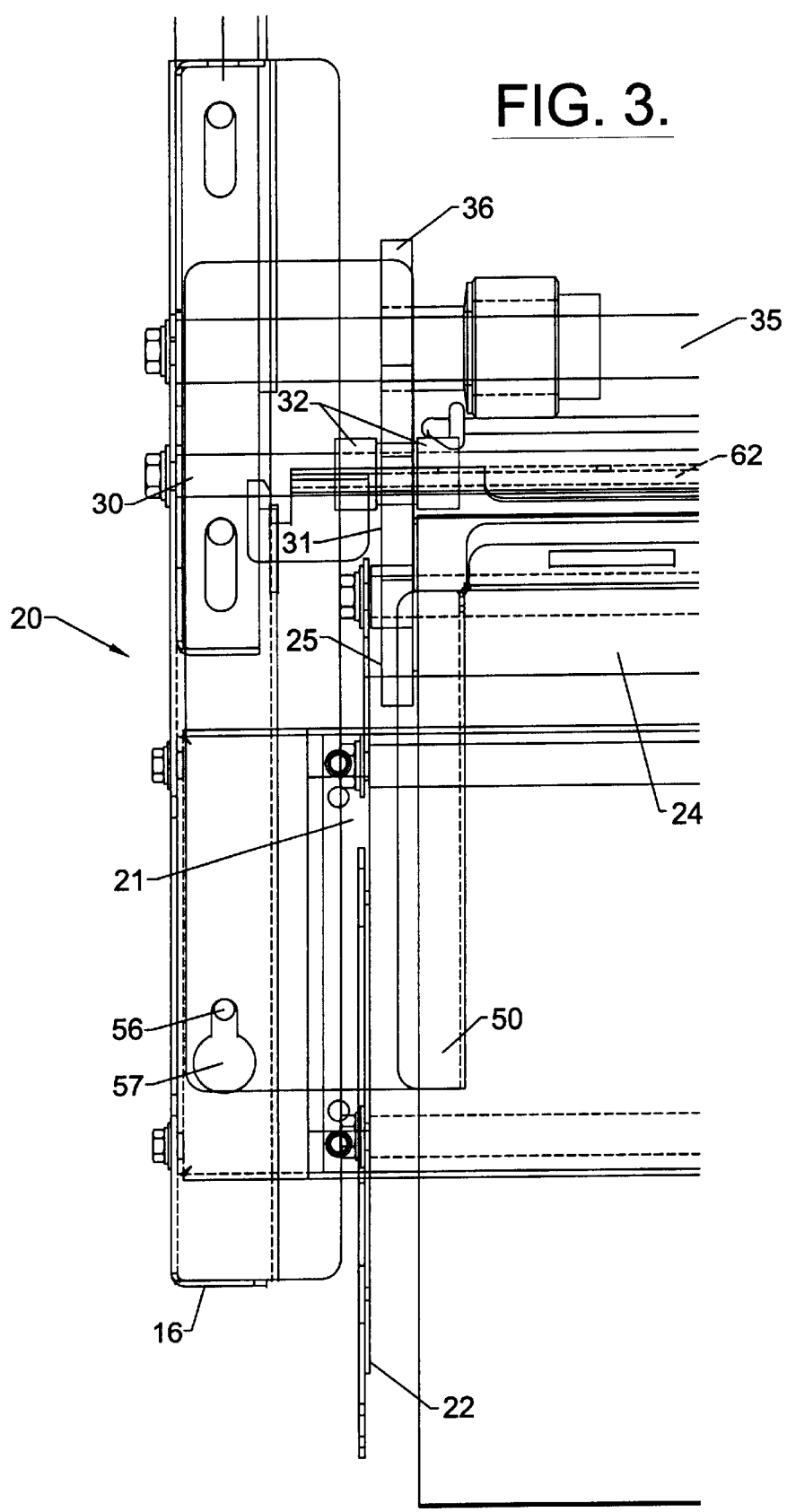
FIG. 3 is a partial horizontal sectional view of one side of the loader taken along line 3—3 of FIG. 1.

Those skilled in the art will appreciate that there are many different mechanisms by which to impart rotational movement to the first roller 24 or to the second roller 26. For example, the roller or axle shaft of the roller may be operatively connected to a motor, either directly or though use of drive chains or drive belts. A particularly advantageous mechanism for imparting rotational movement to the first roller 24 utilizes the existing means in a conveyorized cooking apparatus that drive the cooking conveyor to also power the endless loading belt and is illustrated in FIGS. 2 and 3. A spur gear 36 is added to the cooking conveyor belt axle shaft 35 at the forward portion of the conveyorized cooking apparatus (if one is not already present). An idler shaft 30 is journaled between the pair of forwardly extending housing arms 16 in a position close enough to the cooking conveyor to allow an idler shaft spur gear 31 positioned on the idler shaft 30 to mesh with the conveyor belt axle shaft spur gear 36. A pair of idler shaft positioning collars 32 are used to position the idler shaft spur gear 31 axially on the idler shaft 30 such that the idler shaft spur gear 31 meshes with the conveyor belt axle shaft spur gear 36. Because the conveyor belt axle shaft spur gear 36 is rigidly connected to the rotating conveyor belt axle shaft 35, and because the idler shaft 30 is rotatably journaled between the forwardly extending housing arms 16, rotational movement of the conveyor belt axle shaft spur gear 36 imparts counter-rotational movement to the idler shaft spur gear 31.

When the loader frame 21 is in its operating position and supported by the support cross member 18, a roller spur gear 25 rigidly attached to the first roller 24 meshes with the idler shaft spur gear 31. The movement of the idler shaft spur gear 31 imparts counter-rotational movement to the roller spur gear 25 and hence to the first roller 24 so as to rotate in the same direction as the spur gear 36 and the conveyor belt axle shaft 35. The frictional engagement between the endless loading belt 40 around the first roller 24 ensures that rotational movement of the first roller drives the endless loading belt 40, whereby the endless loading belt 40 moves in the same direction as the cooking conveyor belt.

The frame 21 includes a pair of elongate loader frame arms 22 which journal the first roller 24 between one end of the frame arms 22. The second roller 26, is journaled between the frame arms 22 on the opposite end of the frame arms from the first roller. A pair of loader support plates 23 extend between the pair of loader frame arms 22 to provide support for the endless loading belt and any food patties thereon.

The second roller 26 includes a spring loaded axle shaft 28. The spring loaded axle shaft 28 is normally biased axially outwardly in the fully extended position; however, the shaft is axially movable to allow removal of the second roller 26 by merely pushing against the spring loaded axle shaft 28 until the shaft is no longer retained in its journaled position. Removal of the second roller facilitates removal of the endless loading belt for replacement or cleaning. A circumferential groove 27 (FIG. 4) may be formed in the first and second rollers to cooperate with a corresponding inwardly extending ridge 45 (FIG. 4) on the inward side of the endless loading belt 43 to prevent lateral or side-to-side movement of the endless loading belt during operations.

Figure 5:
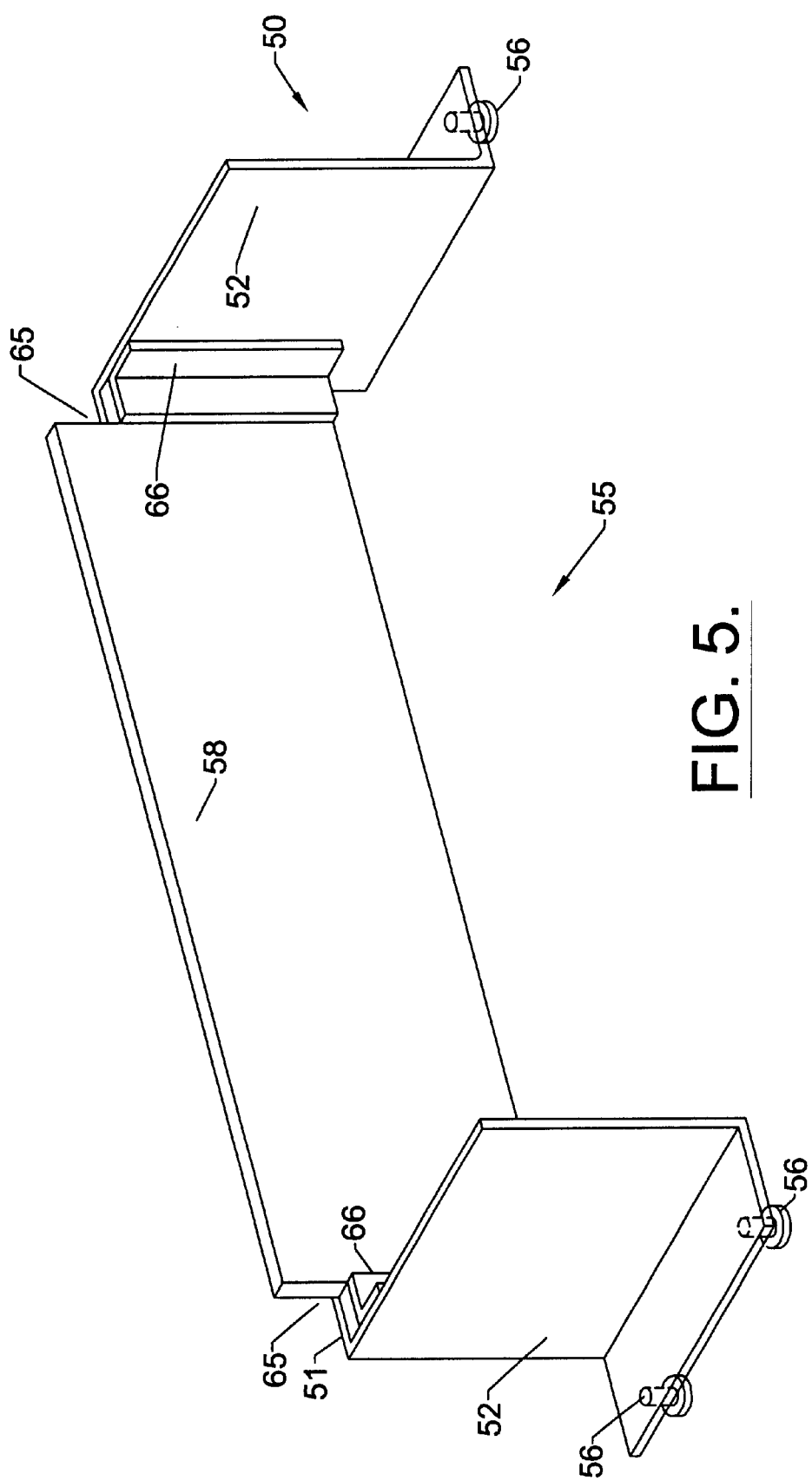
FIG. 5 is a perspective view of the dispensing partition unit according to one embodiment of the present invention.

FIGS. 3 and 5 also illustrate a suitable attachment means for the dispensing partition unit 50, which, like the loader frame is removable. One suitable mechanism for removably attaching the dispensing partition unit 50 onto the forwardly extending housing arms 16 includes the provision on the partition unit 50 of mounting posts 56 having enlarged heads and the provision on the housing arms 16 of mounting openings 57 each having an area of enlarged radius for receiving a mounting post enlarged head and an area of smaller radius for retaining the post. To attach the dispensing partition unit 50 to the forwardly extending housing arms 16, the mounting posts 56 are positioned over the mounting openings 57 and the dispensing partition unit is lowered into contact with the forwardly extending housing arms 16. The dispensing partition unit is then slid to position the mounting posts 56 in the reduced diameter portions of the mounting openings 57 such that the enlarged heads on the mounting posts secure the dispensing partition unit to the forwardly extending housing arms. The dispensing partition unit illustrated in FIG. 3 uses one mounting post 56 on each side, while the partition unit illustrated in FIG. 5 uses two mounting posts on each side.

Figure 4:
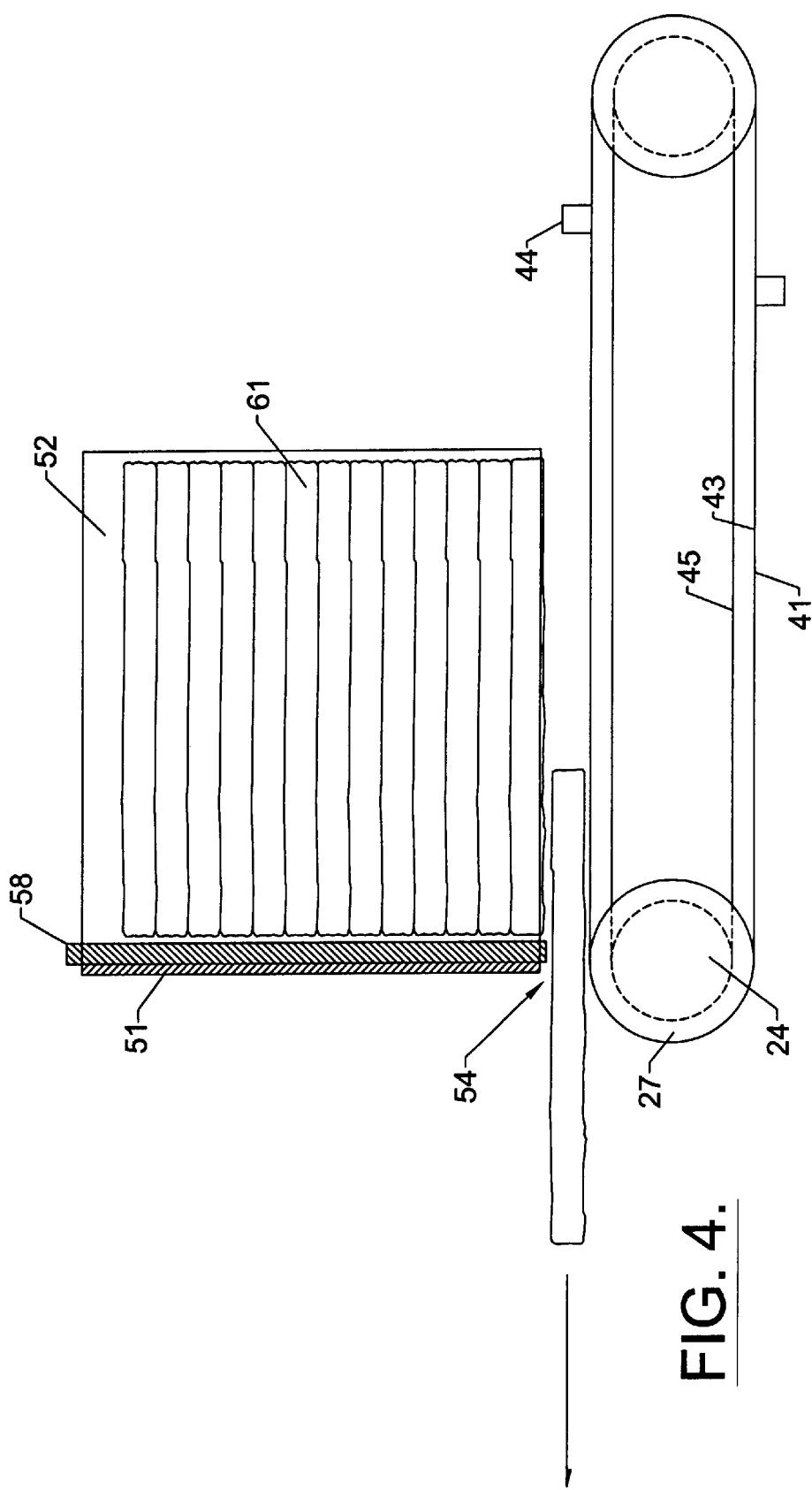
FIG. 4 is a partial vertical sectional view of the loader taken along line 4—4 of FIG. 1.

FIGS. 1, 4 and 5 illustrate the dispensing partition unit 50, which includes a transverse partition 51, a TEFLON sheet 58, and may include a plurality of longitudinal partitions 52. Together, the transverse partition 51 and the longitudinal partitions 52 define the plurality of dispensing stations 55. FIG. 1 illustrates an embodiment of the present invention in which the dispensing partition unit defines two dispensing stations and FIG. 5 illustrates an embodiment having a single dispensing station. Stacks of patties to be cooked are loaded at the dispensing stations 55.

The dispensing partition unit 50 is mounted at a spacing above the endless loading belt 40 such that a passage space 54 exists between the TEFLON sheet 58 and the endless loading belt 40. The distance between the TEFLON sheet 58 and the endless loading belt 40 must be sufficient to allow passage of a food patty to be cooked but the distance must not be great enough to allow two such food patties to pass. Determining the appropriate passage space distance is relatively simple because once a restaurant determines the weight of patties it will serve, those patties are usually supplied to the restaurant frozen, wherein each patty of a certain weight has a substantially uniform width. Likewise, it is possible to determine an appropriate passage space distance for irregularly-shaped patties such as chicken filet patties because restaurants typically use a predetermined uniform weight of such irregularly shaped patties, which results in a relative uniform range of patty thicknesses. It is therefore possible to determine an appropriate passage space distance for such irregularly-shaped patties by determining the uniform range of thicknesses of these patties used by the restaurant. The loader of the present invention advantageously allows for larger or smaller meat passage spaces 54, i.e., different dispensing stations 55 may have a different size passage space 54.

While FIG. 1 illustrates a dispensing partition unit 50 defining two dispensing stations 55, it should be understood that the present invention is not limited to the use of two dispensing stations. Indeed, in some instances it may be desirable to include only a single dispensing station spanning the entire width of the cooking conveyor, as illustrated in FIG. 5. Conversely, it may be advantageous to utilize a dispensing partition unit defining more than one dispensing station. In this instance, the number and location of the dispensing stations 55 may, but does not have to, correspond with the number and location of interior cooking chambers 12 in the conveyorized cooking apparatus 10. Such an arrangement advantageously allows different types of patties to be loaded at the different dispensing stations and fed into cooking chambers having different temperatures or travel times. Use of several dispensing stations may also be used to ensure that patties load onto the cooking conveyor at consistent locations.

Advantageously, a sheet of smooth or "non-stick" material such as TEFLON may be positioned adjacent to and forward of the transverse partition 51 at each dispensing station to prevent patties from sticking to the transverse partition. Without such a non-stick surface or TEFLON sheet 58, relatively cool patties may stick to the transverse partition 51, which is relatively warm given its proximity to the cooking apparatus. When present, the TEFLON sheet 58 provides a smooth surface that allows the patty stacks 61 to slide downwardly as the lowermost patty on each stack is loaded into the conveyorized cooking apparatus. Additionally, the TEFLON surface 58 also facilitates ease of cleaning because remnants of patties do not bake on the TEFLON surface as they might bake on the transverse partition 51 in the event that no such TEFLON sheet 58 is used.

As shown in FIG. 5, the TEFLON sheet 58 may be held in position adjacent to and forward of the transverse partition 51 by holders 66 mounted on the longitudinal partitions 52. Moreover, the TEFLON sheet 58 should be sized slightly larger than the transverse partition 51 to ensure that patties do not come into contact with the transverse partition and may be provided with a pair of notches 65. Provision of the notches 65 allows the TEFLON sheet 58 to be used for changing the thickness of the passage space 54. Specifically, the TEFLON sheet 58 illustrated in FIG. 5 may be removed from its holders 66, turned upside down, and reinserted into the holders. In this way, a portion of the TEFLON sheet 58 would extend toward the endless loading belt a distance greater than the TEFLON sheet extended before being turned upside down, thereby changing the thickness of the passage space 54 between the TEFLON sheet 58 and the endless loading belt 40. The transverse partition 51 provides structural support for the TEFLON sheet 58 as the patty stacks are urged into contact with the TEFLON sheet by the outwardly extending cleats 44 on the endless loading belt 40.

Individual patties are fed onto the cooking conveyor by the endless loading belt 40, which as aforedescribed has at least one, and preferably a plurality of the outwardly extending cleats 44 extending outwardly from the outward side 41 of the belt 40. The cleats may extend continuously across the loading belt or, alternatively, several transversely spaced cleats may extend across the endless loading belt. Advantageously, the cleats are equally spaced in the longitudinal direction as the belt travels.

The endless loading belt 40 should be constructed from a material that has a smooth or slippery surface on the outward side 41 so as to present a sufficiently low coefficient of friction in contact with the hamburgers, filet pieces or other such patties to allow the patties to slide along the endless loading belt without damaging either the patties or the belt. Moreover, it has been found that such a surface facilitates cleaning and sanitizing of the endless loading belt, which is periodically performed in the restaurant industry. Conversely, the surface of the inward side 43 of the endless loading belt 40 should have a sufficiently higher coefficient of friction to promote frictional engagement with the first and second rollers 24, 26.

A suitable loading belt may be made from a polyurethane material having a heat-resistant fabric backing. It has been found that this material can satisfactorily withstand the heat at the front of the conveyorized cooking apparatus and satisfactorily perform the loader functions. Additional protection for the endless loading belt may be obtained by installing a heat guard 62 (FIGS. 2 and 3) between the loading belt and the cooking chambers. A suitable loading belt may also be made from metal. For example, as would be recognized by those of ordinary skill in the art, a suitable loading belt may be a metal rod belt, as is conventionally used for cooking conveyors, or may be a metal mesh or non-mesh metal belt. Accordingly, the term "belt" as used herein includes both foraminous and non-foraminous belts, and specifically includes such wire rod and wire mesh conveyors as are known in the conveyorized cooking apparatus art.

The structure and dimensions of the outwardly extending cleats 44 on the outwardly facing side 41 of the endless loading belt 40 are selected such that the cleats 44 extend from the loading belt a distance sufficient to contact and push patties into the conveyorized cooking apparatus but do not extend from the endless loading belt a distance greater than the distance of the smallest passage space 54. Additionally, the outwardly extending cleats 44 may be resilient or nonresilient and must be sturdy enough to push the patties, the reasons for which will be discussed in more detail below.

Operationally, a stack 61 of frozen hamburgers, filet pieces or other such patties to be cooked is placed on the endless loading belt 40, preferably behind one of the outwardly extending cleats 44, within one of the dispensing stations 55. It should be noted that as used herein, the term "stack" includes not only a plurality of adjacent food patties but also a single food patty—i.e., a stack of one patty. The patty stacks are urged by the traveling motion of the belt 40 into contact with the TEFLON sheet 58 in front of the transverse partition 51 of the dispensing partition unit 50, which blocks movement of the patty stacks as the endless belt travel continues until the next following cleat 44 engages and carries with it through the adjacent space 54 and into the conveyorized cooking apparatus 10 the lowermost patty on the stack of patties.

Because of the TEFLON sheet 58 and the transverse partition 51, the patties above the lowermost patty are blocked from moving with the lowermost patty into the conveyorized cooking apparatus. Where patties are loaded in more than one dispensing station, the lowermost patty at each dispensing station is forced into the conveyorized cooking apparatus by the outwardly extending cleat.

Occasionally, patties will be frozen together and incompletely separated by employees before loading. When this occurs, it is possible that the outwardly extending cleat will be unable to move the lowermost patty into the conveyorized cooking apparatus because the lowermost patty is frozen to the adjacent patty above. This occurrence presents no difficulty for the loader of the present invention.

If the outwardly extending cleats 44 are made from a resilient material, then the cleats give way by bending away from the conveyorized cooking apparatus and travel under the lowermost patty, which slides over each cleat as the endless loading belt continues its travel. When the resilient cleats pass the frozen patties they return to their normal positions. This process of cleats passing under patties frozen together will continue without damage to the loader or patties until the patties are no longer stuck together, i.e., until the patties thaw sufficiently or are manually separated.

On the other hand, if the outwardly extending cleats 44 are made from a nonresilient material, then the endless loading belt should be adapted on the first and second rollers 24, 26 such that the rollers impart movement to the loading belt under normal operating conditions but also such that there can be slippage between the rotating rollers and the loading belt. Then, in the event that travel of the loading belt is stopped by a cleat encountering a lowermost patty that is frozen to the patty above it and thereby prevented from being pushed by the cleat into the cooking apparatus, the loading belt can remain stationary while the rollers continue to rotate without damaging either the rollers or the loading belt. This condition will continue until the patties are no longer stuck together, i.e., until the patties thaw sufficiently or are manually separated.

Using the loader of the present invention, an employee may rapidly load a large number of patties to be cooked into a conveyorized cooking apparatus with a minimal amount of time by merely separating the frozen patties in a frozen stack and placing several stacks on the endless loading belt. The employee is then free to perform other tasks and the loader will automatically feed the patties into the conveyorized cooking apparatus. In so doing, the loader ensures a uniform spacing of successive patties and uniform placement of the patties onto the cooking conveyor. The spacing between successive patties is determined by the distance between successive outwardly extending cleats 44 on the endless loading belt as well as the speed of travel of the loading belt. Moreover, the loader of the present invention maximizes use of the available cooking chamber area by ensuring that patties are loaded systematically across the entire width of the cooking conveyor. The possibility of undercooking patties is minimized because the loader ensures that each patty travels through the entire cooking run of the conveyorized cooking apparatus.

An important advantage of the present invention is that, because the patties enter the conveyorized cooking apparatus from uniform locations and have uniform spacing between successive patties, they necessarily exit the conveyorized cooking apparatus at uniform locations and with a uniform space between successive patties. This facilitates the use of catch pans at the discharge of the conveyorized cooking apparatus to collect cooked hamburger patties or filet pieces. Such catch pans may be sized to hold a predetermined number of cooked patties based on the desired number of patties to be loaded at each dispensing station.

It will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary at the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements. Although specific terms are employed herein, they are used in a generic and descriptive sense only and not for the purpose of limitation.

What is claimed is:

1. An apparatus for loading food patties into an entry opening of a conveyorized cooking apparatus, the apparatus for loading food patties comprising:
    a frame;
    a nonforaminous endless loading belt supported on said frame;
    at least one resilient cleat extending outwardly from said endless loading belt and adapted and positioned to contact the lowermost patty of a stack of patties placed on said endless loading belt when said endless loading belt is driven, said cleat being flexible to yieldably deflect under said stack of patties if the lowermost patty cannot be disengaged from the stack of patties; and
    a transverse partition spaced from said endless loading belt such that when the loading apparatus is positioned adjacent the entry opening and said endless belt is driven, the lowermost food patty is urged into contact with said at least one cleat and pushed by said at least one cleat between said endless loading belt and said transverse partition and into the entry opening.

2. An apparatus for loading food patties into a conveyorized cooking apparatus as defined in claim 1, further comprising at least one longitudinal partition adjacent said transverse partition to define at least one dispensing station.

3. An apparatus for loading food patties as defined in claim 2, further comprising more than one longitudinal partitions adjacent said transverse partition to define more than one dispensing stations.

4. An apparatus for loading food patties as defined in claim 2, further comprising a plurality of cleats transversely-spaced such that at least one cleat is urged into contact with the lowermost patty of a stack of patties placed on said endless loading belt at each dispensing station as said endless loading belt is driven.

5. An apparatus for loading food patties as defined in claim 1, further comprising:
    at least two axle shafts rotatably supported on said frame and around which said endless belt travels when at least one axle is driven to rotate; and
    a motor operatively connected to at least one axle shaft of said at least two axle shafts such that the at least one axle shaft to which said motor is operatively connected is made to rotate when said motor is energized.

6. An apparatus for loading food patties into an entry opening of a conveyorized cooking apparatus, the apparatus for loading food patties comprising:
    a frame;
    a pair of rollers supported on said frame;
    a nonforaminous endless loading belt having an inwardly-facing side in frictional engagement with said pair of rollers and an outwardly-facing side having at least one resilient cleat extending outwardly therefrom, said cleat being flexible to yieldably deflect under a stack of patties placed on the belt if a lowermost patty cannot be disengaged from the stack of patties; and a transverse partition spaced from said endless loading belt, wherein when the apparatus is positioned adjacent an entry opening in the conveyorized cooking apparatus and at least one roller of said pair of rollers is driven, said endless loading belt is made to travel and the lowermost food patty is urged into contact with said at least one cleat defined by said endless loading belt and pushed between said endless loading belt and the transverse partition and into the conveyorized cooking apparatus.

7. An apparatus for loading food patties as defined in claim 6, further comprising at least one longitudinal partition adjacent said transverse partition to define at least one dispensing station.

8. An apparatus for loading food patties as defined in claim 7, further comprising more than one longitudinal partitions adjacent said transverse partition to define more than one dispensing stations.

9. An apparatus for loading food patties as defined in claim 6, further comprising a roller spur gear on one roller of said pair of rollers and an idler spur gear rotatably supported on said frame in cooperative engagement with said roller spur gear, said idler spur gear adapted and positioned such that when the apparatus for loading food patties is positioned adjacent the entry opening, said idler spur gear is also in cooperative engagement with a spur gear on an axle shaft of a cooking conveyor in the conveyorized cooking apparatus such that said endless loading belt is driven whenever the cooking conveyor spur gear is driven.

10. A loader for a conveyorized cooking apparatus as defined in claim 6 wherein the outwardly-facing side of said endless loading belt has a plurality of cleats.

11. A loader for a conveyorized cooking apparatus as defined in claim 6 wherein the outwardly-facing side of said endless loading belt has a plurality of transversely spaced cleats.

12. An apparatus for loading food patties as defined in claim 6, further comprising a TEFLON surface adjacent said transverse partition spaced from the outwardly-facing side of said endless loading belt such that all patties except the lowermost patty of a stack of patties placed on said endless loading belt are urged into contact with said TEFLON surface when said endless loading belt is driven.

13. A loader for a conveyorized cooking apparatus as defined in claim 6 wherein the inwardly-facing side of said endless loading belt has a greater coefficient of friction than the outwardly-facing side of said endless loading belt.

14. A loader for a conveyorized cooking apparatus as defined in claim 6 wherein each roller of said pair of rollers defines at least one circumferential groove and wherein the inwardly-facing side of said endless loading belt defines at least one ridge corresponding to each circumferential groove to minimize axial movement of said endless loading belt when said belt travels around said pair of rollers.

15. A loader for a conveyorized cooking apparatus as defined in claim 6 wherein the outwardly-facing side of said endless loading belt is made from polyurethane.

16. A loader for a conveyorized cooking apparatus as defined in claim 6 wherein said endless loading belt is made from metal.

17. A conveyorized cooking apparatus comprising:

at least one cooking chamber having an entry opening thereto;

a driven endless cooking conveyor having a path of travel through said at least one cooking chamber;

at least one burner element adapted and positioned to provide heat to said at least one cooking chamber for the cooking of food items traveling on said endless cooking conveyor; and a loader adjacent the entry opening, comprising:
a nonforaminous driven endless loading belt having an outwardly-facing side having at least one resilient cleat extending therefrom, said cleat being flexible to yieldably deflect under a stack of patties placed on the belt if a lowermost patty cannot be disengaged from the stack of patties; and a transverse partition spaced from said endless loading belt, wherein the lowermost food patty is urged into contact with the at least one cleat and pushed between said endless loading belt and the transverse partition and into the at least one cooking chamber of the conveyorized cooking apparatus.

18. A loader for a conveyorized cooking apparatus, comprising:

conveyor means for transporting food products into the cooking apparatus; and partition means associated with the conveyor for blocking the transport of food products therealong, the partition means defining at least one station for stacking food patties on the conveyor means and the partition means being spaced above the conveyor means, wherein the lowermost food patty of a stack of food patties placed on the conveyor means may pass therewith, when in contact with a resilient cleat thereon, through the space between the conveyor means and the partition means and into the conveyorized cooking apparatus;

said cleat being flexible to yieldably deflect under the patty stack if the lowermost patty cannot be disengaged from the patty stack.

19. A loader for a conveyorized cooking apparatus as defined in claim 18 wherein said conveyor means comprises a nonforaminous driven endless belt.

20. A method of loading food patties into an entry opening of a conveyorized cooking apparatus comprising the steps of:

providing a patty stack;

transporting the patty stack on a resiliently cleated conveyor traveling toward an entry opening in the conveyorized cooking apparatus;

contacting all patties in the traveling patty stack except the lowermost patty to thereby prevent all patties except the lowermost patty from entering the entry opening in the conveyorized cooking apparatus;

contacting the lowermost patty on the traveling stack of patties with a resilient cleat, said cleat being flexible to yieldably deflect under the patty stack if the lowermost patty cannot be disengaged from the patty stack; and urging the lowermost patty into the entry opening of the conveyorized cooking apparatus.

* * * * *